Patented July 10, 1945

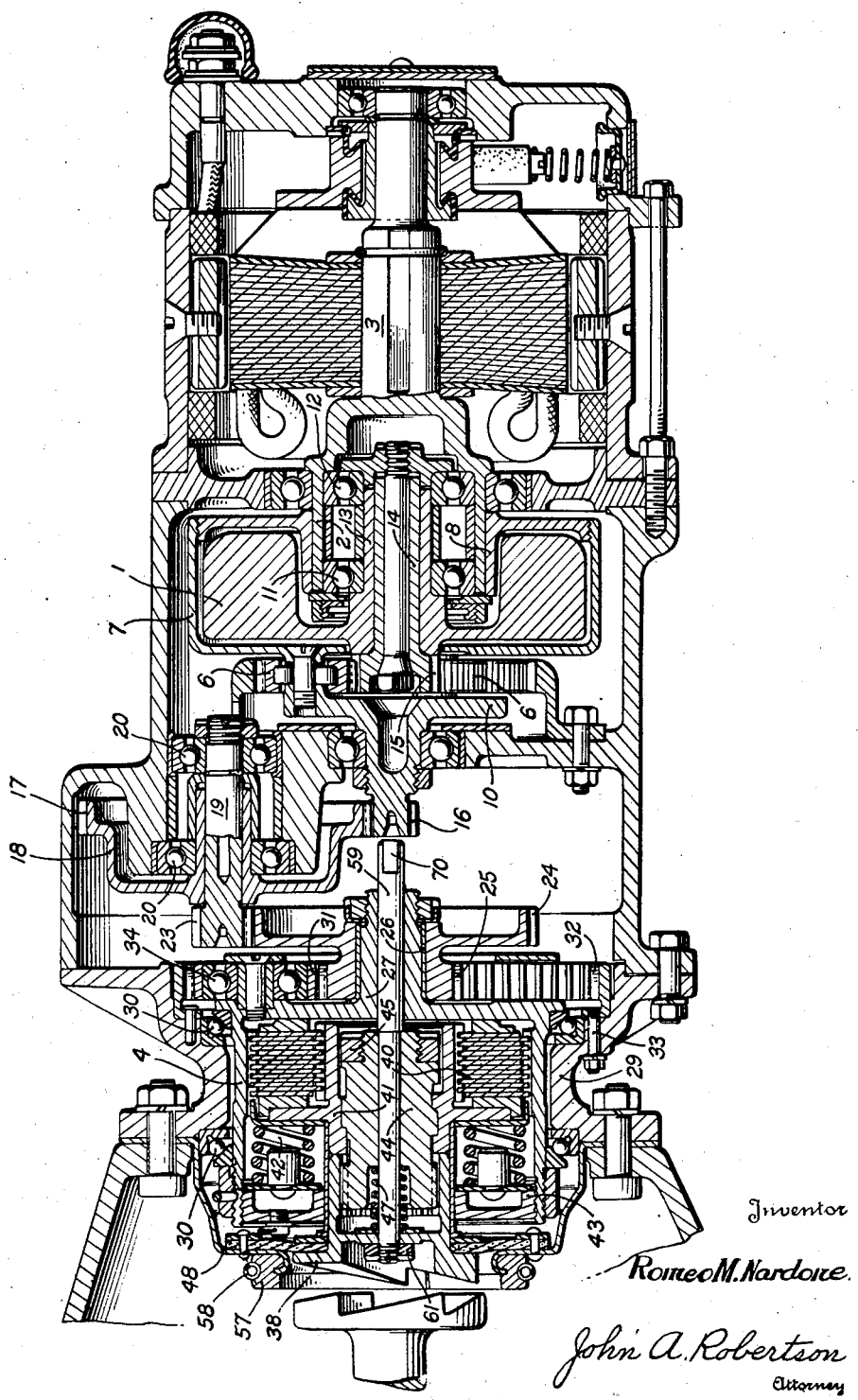

2,380,064

UNITED STATES PATENT OFFICE 2,380,064

ENGINE STARTING MECHANISM

Romeo M. Nardone, Teaneck, N. J., assignor to Bendix Aviation Corporation, South Bend, Ind., a corporation of Delaware Original application April 8, 1941, Serial No. 387,539. Divided and this application January 15, 1944, Serial No. 518,429

2 Claims. (Cl. 74—259)

This invention relates to internal combustion engines, and particularly to the starting of an internal combustion engine by imparting initial rotary movement to the engine crank-shaft, through the agency of a mechanical torque transmitting starter mechanism.

In electric motor-driven inertia starters, the motor is of the high-speed, low-torque type serving the one purpose of accelerating the flywheel to a high speed. In electric direct cranking starters, the motor again serves only one purpose and it is designed to have low-speed, high-torque characteristics. In a combination inertia-direct cranking unit, the motor has to serve the dual purpose of first accelerating the flywheel and subsequently cranking the engine; and since this necessitates a compromise in the design of the motor, the efficiency of the unit for either of the two purposes has been comparatively low, and the maximum flywheel speed attainable has been less than is desirable for the starting of the high-powered engines now being used.

An object of the present invention is to eliminate the above objections by providing a starter in which the flywheel may be rotated to a speed much higher than has been possible heretofore, but without any corresponding increase in the maximum motor speed.

Another object is to provide novel means for journaling a high speed flywheel, so as to render more feasible its rotation at speeds in excess of any heretofore employed in inertia starting mechanism.

A further object is to incorporate, in a starter assembly of the character aforesaid, a planetary gear arrangement that is particularly adapted to carrying out the indicated objectives.

These and other objects of the invention will become apparent from inspection of the following specification when read with reference to the accompanying drawing wherein is illustrated the preferred embodiment of the invention. It is to be expressly understood, however, that the drawing is for the purpose of illustration only, and is not designed as a definition of the limits of the invention, reference being had to the appended claims for this purpose.

In the drawing, flywheel 1 is mounted on ball bearings supported in a hollow extension 2 of armature shaft 3. A planetary set is interposed between the flywheel 1 and the other three stages of gear reduction to the barrel 4, and the planets 6 of this first planetary set are carried by a drum 7 which envelops the flywheel and rotates with the hollow armature extension 2; the latter being keyed or splined to the hub 8 of the drum to insure such unitary rotation.

In order to make it possible for flywheel 1 to operate satisfactorily at speeds as high as 30,000 R. P. M., I locate the bearings 11 and 12 in such manner that their outer races rotate in synchronism with armature extension 2. With this arrangement the relative rotation of the balls in the bearing assemblies is fairly low, the effect being the same as if the outer race were held stationary and the inner race rotated at ordinary speeds. Actually the inner race rotates at the unusually high speed of the hub portion 13 of flywheel 1.

Within hub 13 is a sleeve 14 secured thereto for rotation therewith. Sleeve 14 terminates in a pinion 15 which is the sun gear for planets 6. These planets drive a plate 10 which is shown in the form of a flange on a shaft which terminates in a pinion 16. Pinion 16 meshes with a spur gear 17 which, in the form shown, is formed on the large periphery of a bell-shaped member 18. Extending within and keyed to the member 18 is a shaft 19 supported by a pair of bearings 20 that are maintained in spaced relation by suitable means, as shown. The shaft 19 terminates in a toothed portion forming a pinion 23 adapted to engage a spur gear 24, the latter being integral with a smaller spur gear 25, and the two being rotatably mounted, as by means of a bushing 26, on a stub shaft 27 that extends outwardly from, and is integral with, the barrel 4. Ball bearings 30 carried by the inner housing section 29 are employed for rotatably mounting the barrel 4.

Gear 25 constitutes a sun gear for a plurality of planetary gears 31 that are provided with bearings 34 for rotation with barrel 4, and mesh with an annulus gear 32 which is fixedly mounted within the housing by means of studs 33. Preferably three planetary gears 31 are employed, and one of these is shown in section in the drawing. These gears 31 are preferably spaced 120° apart, so that as the view is taken, one of the gears would appear in elevation just below the stub shaft 27; but in order to avoid confusing the teeth of this second gear 31 with those of the internal gear 32, the former has not been shown.

For torque limiting purposes there is preferably employed a multiple disc clutch embodying a plurality of friction discs 40, a number of said discs being splined to the inner surface of barrel 4, and the remainder being splined to the outer surface of an interiorly threaded nut 41. Resilient means such as a plurality of coil springs 42 and an adjusting nut 43, which is threaded into the inner end of barrel 4, are provided for varying the pressure with which discs 40 are maintained in engagement.

Mounted for rotary and longitudinal movement within nut 41 is a threaded shaft 44 which is longitudinally splined at its inner end to drivably engage a correspondingly splined, tubular and outwardly extending portion of the engine-engaging member 38. Movement of threaded shaft 44 to the left, as viewed in the drawing, relative to nut 41, is positively limited by means of a member 45 threaded on the outer end of shaft 44 and constituting a stop shoulder for engagement with a shoulder formed interiorly of nut 41. Preferably a coil spring 47 is interposed between member 38 and shaft 44, a portion of said spring extending into a recess formed in the inner end of the shaft, to yieldingly resist relative axial movement between the clutch member 38 and the shaft 44. A split-ring 57 is supported on the curved lip of the oil seal member 48, and the separate portions of the split-ring 57 are preferably retained in position on member 48 by means of a surrounding coil spring 58 which rests in an annular groove formed in the outer periphery of said ring 57. The latter is adapted to rotate on the curved lip surrounding the central opening in member 48, and facilitates engine-engaging movement of the member 38, as more fully explained in Patent No. 1,962,397, granted to Raymond P. Lansing on June 12, 1934. Also as in the Lansing patent, a rod 59 slidably extends through stub shaft 27, threaded shaft 44 and a central opening in the hub of member 38. The inner portion of rod 59 is of reduced diameter to provide a shoulder which normally abuts against the outer end of shaft 44. The inner end of rod 59 is threaded to receive a nut 61 which abuts against the hub of member 38 and coacts with the shoulder to retain said member and shaft 44 in operative relationship. The outer end of rod 59 is flattened, as indicated at 70, to receive a lever (not shown) corresponding to the lever 40 of Lansing Patent No. 1,962,398, and having associated therewith operating mechanism corresponding to that shown at 41, 42 and 42a in Fig. 4 of the said Lansing Patent No. 1,962,398, to serve as the means for controlling engagement and disengagement of member 38.

In operation, current is delivered to motor 3 to accelerate the flywheel 1 and thus store energy therein prior to moving member 38 to engine-engaging position. Due to the planetary step-up gearing that is interposed in the drive to the flywheel—said drive including the members 3, 2, 8, 7, 6, 15, 14 and 13, in the order named—the flywheel 1 will be accelerated to a speed which is several times greater than the speed of armature shaft 3. Hence the motor may have the low-speed, high-torque characteristics that are best suited for direct-cranking of the engine, and even though its maximum speed is no greater than, say, 7,000 R. P. M., the step-up to the flywheel will insure a flywheel speed far in excess of that heretofore possible with the conventional direct drive between motor and flywheel.

When maximum energy has thus been stored in flywheel 1, the operator will actuate rod 59 to move member 38 to engine-engaging position, while still maintaining the flow of current to motor 3. This may be done by employing any suitable two-position switch, such as is illustrated in Fig. 6 of my application No. 387,540, filed April 8, 1941. When member 38 has thus been moved to engine-engaging position, the cranking of the engine will begin, and can be continued until the engine acquires sufficient momentum for self-operation. When this occurs the operator breaks the motor circuit and allows rod 59 to resume the position shown in the drawing, in which position the member 38 is withdrawn from engine-engaging position.

This application is a division of my application Serial No. 387,539, filed April 8, 1941.

What is claimed is:

1. In an engine starter, a flywheel, flywheel accelerating means including a driving shaft having a hollow extension, and a planetary step-up gear train having a planet carrying element surrounding said flywheel and drivably secured to said hollow shaft extension to be rotated by the latter, said step-up gear train also including a central pinion having driving connection with said flywheel, to drive the latter, and supporting means for said pinion and shaft extension, said supporting means including a pair of concentric bearing assemblies, one of which is interposed between said pinion and shaft extension, and the other being adjacent the outer surface of said shaft extension.

2. In an engine starter, a flywheel, flywheel accelerating means including a driving shaft, and a planetary step-up gear train having a planet carrying element surrounding said flywheel and drivably secured to said shaft to be rotated by the latter, said step-up gear train also including a central pinion having driving connection with said flywheel, to drive the latter, and supporting means for said pinion and shaft, said supporting means including a pair of concentric bearing assemblies, one of which is interposed between said pinion and shaft, and the other being adjacent the outer surface of said shaft.

ROMEO M. NARDONE.